(12) United States Patent
Henderson et al.

(10) Patent No.: US 7,315,277 B2
(45) Date of Patent: Jan. 1, 2008

(54) BIT DEPTH REDUCTION FOR ANALOG TO DIGITAL CONVERSION IN GLOBAL POSITIONING SYSTEM

(75) Inventors: Robert L. Henderson, Ellicott City, MD (US); Mark A. Asher, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 1294 days.

(21) Appl. No.: 10/425,271

(22) Filed: Apr. 29, 2003

(65) Prior Publication Data

US 2006/0125688 A1    Jun. 15, 2006

Related U.S. Application Data

(60) Provisional application No. 60/376,724, filed on Apr. 30, 2002.

(51) Int. Cl.
*G01S 5/14* (2006.01)
(52) U.S. Cl. .................................................. 342/357.02
(58) Field of Classification Search ............ 342/357.02
See application file for complete search history.

(56) References Cited

U.S. PATENT DOCUMENTS

| | | | | |
|---|---|---|---|---|
| 5,363,112 A | * | 11/1994 | Hatcher | 342/389 |
| 6,498,819 B1 | * | 12/2002 | Martin | 375/345 |
| 6,611,794 B1 | * | 8/2003 | Fleming-Dahl | 702/191 |
| 6,670,914 B1 | * | 12/2003 | Najarian et al. | 342/357.06 |
| 6,681,181 B2 | * | 1/2004 | Fielder | 701/213 |

* cited by examiner

*Primary Examiner*—Gregory C Issing
(74) *Attorney, Agent, or Firm*—Albert J. Fasulo, II (57) ABSTRACT

Disclosed is a system and method for reducing a bit-depth requirement for an A/D converter in a GPS receiver having an antenna for receiving an analog input signal and a low noise amplifier for amplifying the input signal, comprising a filter for filtering about a bandwidth B the amplified signal; a down-conversion module centering the frequency of the filtered signal about a center frequency $f_0$; an automatic gain controller (AGC) for setting a set point of the input signal; an adder for adding noise to the gain controlled signal, said noise based upon the bandwidth B and center frequency $f_0$; and an analog to digital (A/D) converter for converting the added noise signal to a digital signal, wherein the noise added to the gain controlled signal reduces the bit depth requirement of the A/D converter.

18 Claims, 3 Drawing Sheets

BIT DEPTH REDUCTION FOR ANALOG TO DIGITAL CONVERSION IN GLOBAL POSITIONING SYSTEM

CROSS-REFERENCE TO RELATED APPLICATIONS

This application claims the benefit of U.S. Provisional Application No. 60/376,724, filed Apr. 30, 2002, the contents of which are incorporated herein by reference.

STATEMENT OF GOVERNMENTAL INTEREST

This invention was made with Government support under Contract No. F29601-00D-0244 awarded by the United States Air Force. The Government has certain rights in the invention.

BACKGROUND OF THE INVENTION

1. Field of the Invention

The present invention relates generally to a system and method for an analog to digital (A/D) converter, and in particular, to a system and method for managing a bit-depth requirement for an A/D converter in a GPS receiver intended for operation in a high jamming environment.

2. Description of the Relation Art

Global Positioning Systems (GPS) are widely utilized in both commercial and military applications. Whether determining the location of a cellular telephone having a GPS tracking systems, navigating a commercial airliner or military jet, or guiding ordinance to particular targets, the reliance on GPS to provide accurate positioning is increasing.

Along with the increased reliance upon the GPS comes a growing need to provide more accurate and reliable GPS positioning. GPS signals can be adversely affected by various factors including, for example, low signal strength, noise and GPS jamming devices. Each of these causes the GPS system to provide false and inaccurate positioning data in the particular applications. In turn, this inaccurate or false data can cause devastating effects.

Standard GPS techniques for treating jammed signals involve two stages. First, a front-end processing stage is utilized to excise as much of the jammer signal as possible from the raw input; this is commonly referred to as jam suppression processing. Second, extensive correlation and tracking operations are utilized to remove the remaining interference and noise from the GPS signal; this is commonly referred to as signal-detection processing. These operations are most effectively performed in the digital domain. As such, receivers are currently being developed in which the conversion from analog to digital operation occurs after preliminary filtering but precedes all jam suppression and signal detection operations.

Figure 1:
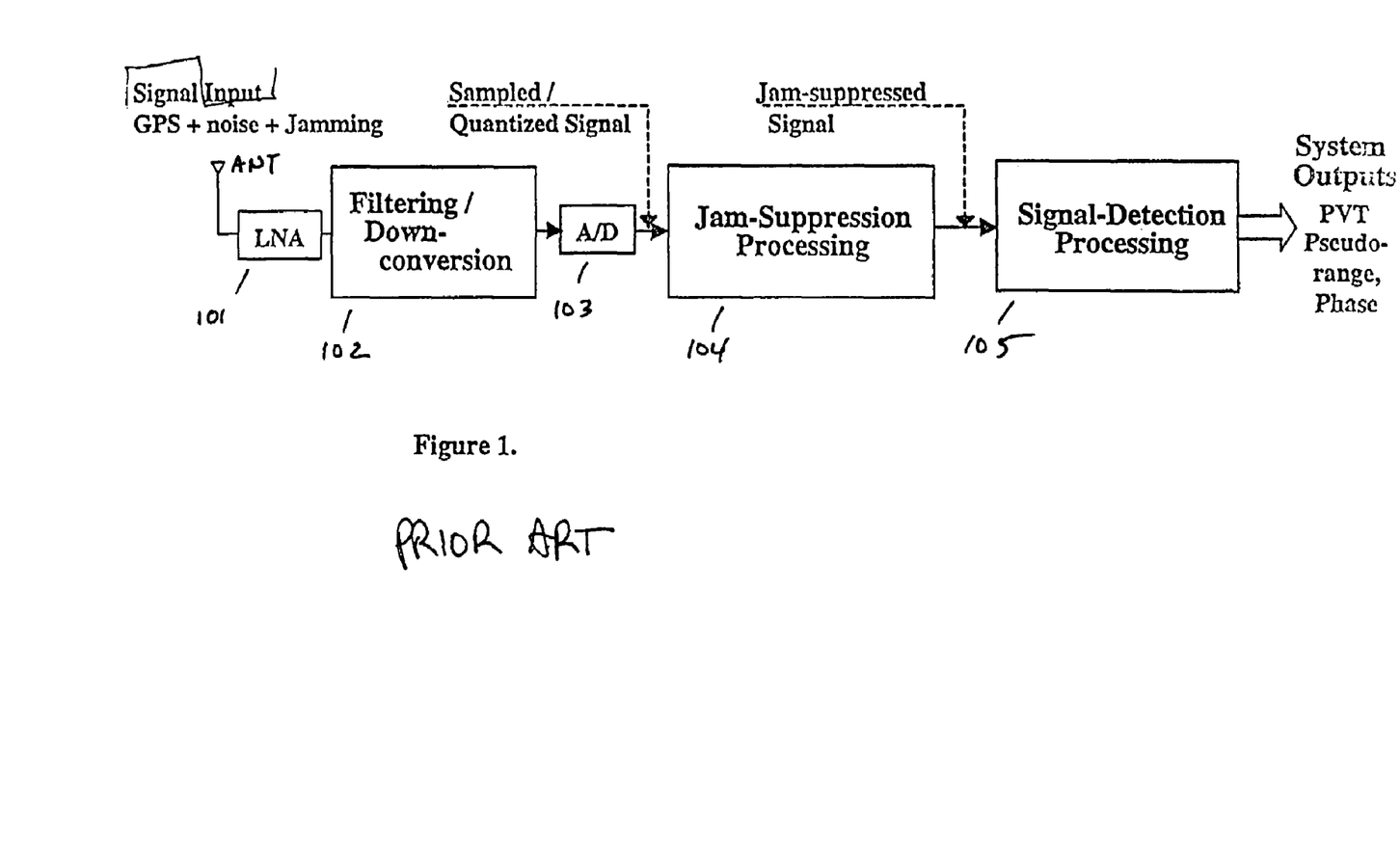
FIG. 1 is a block diagram of a conventional GPS receiver.

FIG. 1 is a block diagram of a conventional GPS receiver. Shown in FIG. 1 is antenna ANT for receiving an input signal. The input signal is comprised of GPS signal, noise and jamming signal. Connected to antenna ANT is low noise amplifier (LNA) 101 for amplifying the input signal. Next is filtering/down-conversion module 102 for filtering the input signal and down converting the filtered signal. The filtered and down-converted signal is then processed by A/D converter 103. According to this conventional structure, the full in-band jamming signal is present at the A/D converter 103 and must be processed by the A/D converter 103, resulting in a sampled/quantized signal output from the A/D converter 103. The processing of the full in-band jamming signal along with the GPS signal in the A/D converter 103 results in a much weaker GPS signal in the sampled/quantized signal being available to subsequent jam suppression processing module 104 and a much weaker GPS signal in a jam-suppressed signal being available to subsequent signal detection processing module 105. The above system outputs position (P), velocity (V), orientation (T), pseudorange, and phase components.

The above-described conventional structure requires significant bit-depth (i.e. word length) for the A/D converter 103 to properly convert the analog signal to a digital signal. Typical requirements in the conventional design are a bit-depth of 16-17 bits to accommodate sufficient code processing at a 120 dB jamming-to-signal (J/S) power ratio. Such resolution must be achieved at sample rates of 20-40 MHz to capture the GPS precision (P(Y)) code. The combination of these requirements presents major challenges to A/D technology in linearity, speed, resolution, and power consumption.

An additional concern is that the above bit-depth specification depends directly on the strength of the expected jamming signal. That is, the required number of bits increases logarithmically with the square root of jamming power. Conventional systems designed to a given bit-depth have a hard limit of jamming power that can be accommodated, whatever the power, sophistication and adaptability of the processing that is utilized after the A/D conversion.

Particularly troubling jamming systems are those in which a highly correlated jamming signal is used to jam the GPS signal. One example is a Gaussian jammer having a bandwidth that is much narrower than the GPS signal itself. In such a Gaussian jammer, jammer signal levels from one sample to the next are highly correlated. Another example is a pure tone (e.g. sine wave) jammer. In both of these examples, the jamming signal does not resemble a typical noise-like signal. Conventional A/D conversion yields highly deterministic values. Since the GPS signal is so far below the system thermal noise, elimination of randomness from the A/D converter 103 output effectively eliminates the GPS signal itself, after which no amount of subsequent processing can recover the signal. These examples present situations that require processing at the 16-17 bit bit-depth at the 120 dB J/S power ratio, as this bit-depth is required to, at the minimum, reach the system noise floor, which in turn ensures randomness in the digitized output, and provides enough overall dynamic range so as not to clip the largest values in the input signal.

There is therefore a need to provide system and method for managing a bit-depth requirement for an A/D converter in a GPS receiver intended for operation in a high jamming environment.

SUMMARY OF THE INVENTION

It is, therefore, an aspect of the present invention to provide a system for reducing a bit-depth requirement for an A/D converter in a GPS receiver.

In accordance with another aspect of the present invention, there is provided a method for reducing a bit-depth requirement for an A/D converter in a GPS receiver.

The foregoing aspects of the present invention are realized by a system for reducing a bit-depth requirement for an A/D converter in a GPS receiver having an antenna for receiving an analog input signal and a low noise amplifier for amplifying the input signal, comprising a filter for filtering about a bandwidth B the amplified signal; a down-conversion module centering the frequency of the filtered signal about a center frequency $f_0$; an automatic gain controller (AGC) for controlling the gain of the down-converted signal to one of maximize the dynamic range of the system and minimize clipping of down-converted signal; an adder for adding noise to the gain controlled signal, said noise based upon the bandwidth B, center frequency $f_0$, and a spectral density $N_a/2$; and an analog to digital (A/D) converter for converting the added noise signal to a digital signal, wherein the noise added to the gain controlled signal reduces the bit depth requirement of the A/D converter.

The foregoing aspects of the present invention are realized by a method for reducing a bit-depth requirement for an A/D converter in a GPS (Global Positioning System) receiver having an antenna for receiving an analog input signal, said input signal having a GPS signal component and a jamming signal component, and a jam suppression processor for suppressing the jamming signal component, comprising the steps of adjusting the input signal to a set point; determining a bit depth at which to operate an A/D converter for converting an analog signal into a digital signal; calculating a power level of a least significant bit (LSB) of the digital signal; determining the power level of a noise signal based on the power level of the LSB; adding the noise signal to the adjusted input signal; and A/D converting the noise added signal.

BRIEF DESCRIPTION OF THE DRAWINGS

The above and other objects, features and advantages of the present invention will become more apparent from the following detailed description when taken in conjunction with the accompanying drawings in which.

DESCRIPTION OF THE PREFERRED EMBODIMENTS

A preferred embodiment of the present invention will be described herein below with reference to the accompanying drawings. In the following description, well-known functions or constructions are not described in detail since they would obscure the invention in unnecessary detail.

The present invention circumvents the above-mentioned problems existing in conventional GPS receivers by altering the front-end analog signal processing. The alteration results in a substantially reduced bit-depth requirement. In addition, the present invention allows the A/D converter bit depth to be set and fixed independent of the overall jamming level expected, but dependent on the signal coding. The bit-depth requirement at 120 dB J/S power ratio is of the order of 10-12 bits, primarily based on the effectiveness of the precorrelation jam-suppression processing that follows the A/D conversion. For reasonable settings of the parameters, the losses in this process are limited to the range of −0.5 to 2 dB depending in part on the jammer type, and for example, up to 3 dB for a pure tone jammer. The process disclosed herein exploits statistical features of processing noise of a GPS signal, and in particular the noise-like signal structures that appear in a receiver in which both the A/D conversion process and jam-suppression processing precede the signal-detection stage. In general, the system and method disclosed herein adds artificial noise to the input signal just ahead of the A/D converter so that a smaller number of bits is required to reach an artificial noise floor.

Figure 2:
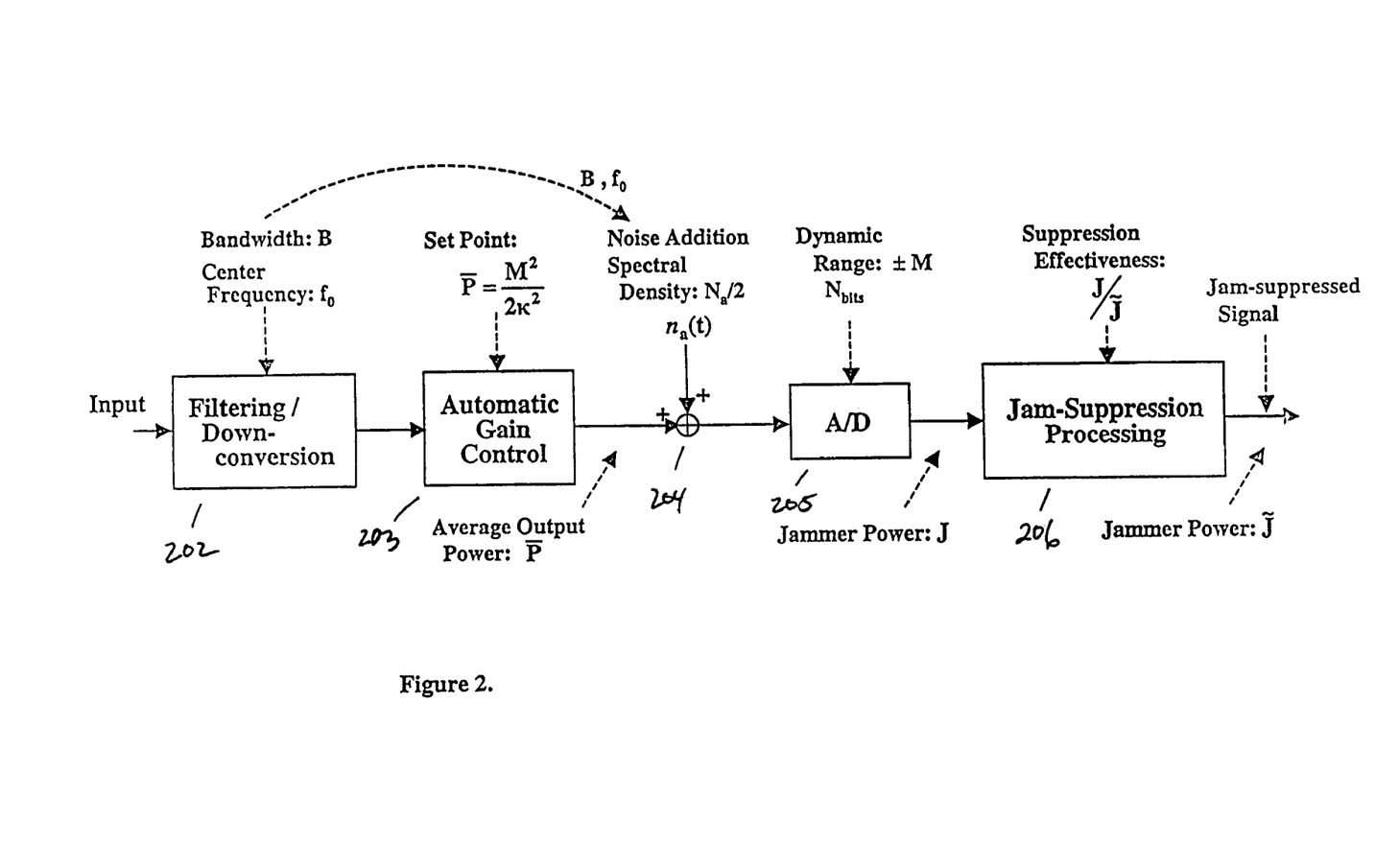
FIG. 2 is a block diagram of a GPS receiver according to an embodiment of the present invention.

FIG. 2 is a block diagram of a GPS receiver according to an embodiment of the present invention. The overall system is under control of a processor (not shown). Shown in FIG. 2 is filtering/down-conversion module 202 for filtering and down-converting a receiver input signal. The antenna ANT, LNA 101 and signal detection processing module 105 shown in FIG. 1 are omitted in FIG. 2 for clarification purposes only, but would be included in a GPS receiver according to the present invention. The filtering/down-conversion module 202 adjusts the bandwidth B and center frequency $f_0$ of the input signal to match the spectrum of the added noise, to be discussed in greater detail below.

Receiving a signal from the filtering/down-conversion module 202 is automatic gain controller (AGC) 203. The AGC 203 is an amplifier that maintains the power level of the input signal within a dynamic range of the A/D converter 205. By maintaining the power level, the AGC 203 performs two important functions. First, the AGC 203 prevents clipping of the input signal. This is important since the GPS signal portion is effectively removed from the digitized signal in any clipped portion. Second, the AGC 203 ensures that the input signal utilizes the entire dynamic range of the A/D converter 205 for providing optimal resolution in the digitized output. In addition, the AGC 203 also sets the average power $\bar{P}$ of the input signal, which is used for further processing.

The output from the AGC 203 is supplied to adder 204. To the AGC 203 output adder 204 adds noise of bandwidth B equal to the bandwidth of the desired signal (e.g., 20.46 MHz for GPS precision P(Y) code), of zero mean, and preferably Gaussian, with constant spectral density $N_a/2$. A noise generator (not shown) generates the noise under control of the processor. The noise signal added to the AGC 203 output signal is shown in FIG. 3.

Figure 3:
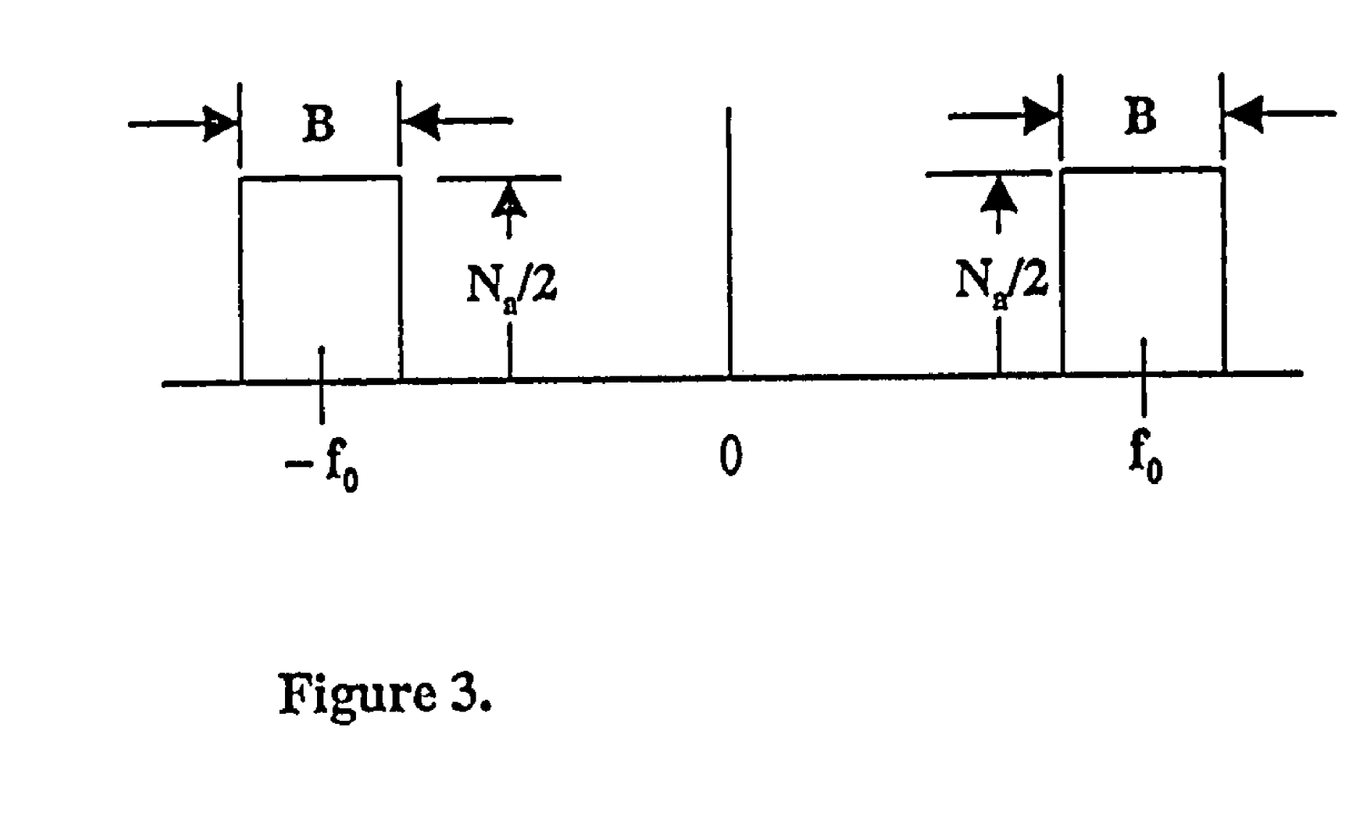
FIG. 3 is a diagram depicting the spectral density of the added noise of FIG. 2.

FIG. 3 is a diagram depicting the spectral density of the added noise of FIG. 2. The added noise power, or equivalent spectral density, is maintained at a constant level relative to the dynamic range of the A/D converter 205. This last feature can be simply designed into the system, since the dynamic range of the A/D converter is itself part of the system design. The selection of $N_a$ will be described in further detail below.

The signal with the added noise is then input into A/D converter 205 for conversion from an analog signal to a digital signal, as shown in FIG. 2. The A/D conversion is defined by its total dynamic range M and the number of bits Nbits. The dynamic range M is preset. The selection of the number of bits Nbits will be described in further detail below.

Jam-suppression processing module 206 has input jammer power J, output (i.e. suppressed) power $\bar{J}$, and suppression effectiveness of $J/\bar{J}$. A ratio of $J/\bar{J}$ equal to 40 dB corresponds to a controlled radiation pattern antenna (CRPA) with a 40 dB null on a single jamming source. The suppression effectiveness ratio $J/\bar{J}$ will also be described in further detail below.

The jam-suppressed signal output from the jam-suppression processing module 206 is then subject to further conventional processing. All processing downstream from A/D converter 205 is generally conventional processing for a digital GPS receiver correcting for jamming signals. The effect of the signal-detection processing module 105 of FIG. 1 on the various jamming signals is utilized to define operating parameters of the system as described below.

It is noted here that a second down-conversion module (not shown) may be required between adder 204 and A/D converter 205, depending on the particular frequency plan of the receiver.

A more detailed description of the design and operation of the above-described system according to an embodiment of the present invention will now be provided. The system described above defines, among others, three key parameters: first, the set point of the AGC 203, which is the average power level to be maintained at the output of the AGC 203; second, the average power of the added noise, essentially the spectral density $N_a$ times the bandwidth B (i.e. $N_a B$); and third, the number of bits Nbits of the A/D converter 205. The first two parameters determine the signal structure of the processing, and within the determined structure, the number of bits Nbits of the A/D converter 205 is determined. As discussed earlier, reducing the number of bits Nbits of the A/D converter 205 improves the overall performance of the GPS receiver.

The set point of the AGC 203 is an average power $\bar{P}$ desired at the output of the AGC 203. The set point is chosen to prevent the A/D converter 205 from clipping the signals. If the voltage range of the A/D converter 205 is ∀M, the set point can be represented by $M=\sqrt{2PK}$, where kappa is chosen to prevent clipping. For example, for kappa=1, M will equal the amplitude of a pure sine wave of average power P. In general, kappa must be greater than one to allow for signal fluctuations about the average power P. Indeed for the case of any Gaussian jammer (as well as for the unjammed case), the instantaneous power of the input signal fluctuates about the average power according to an $X^2$ distribution with two degrees of freedom. To accommodate these cases, a good baseline choice for kappa is 2.628 (i.e. $\sqrt{-\ln(0.001)}$), for which the Gaussian signal is clipped on average only about 0.1% of the time (the amplitude distribution being a Rayleigh distribution). The value of the set point is not critical to the system, but is used below in the numerical assessment of certain performance effects. The set point is determined by Equation 1.

$$\bar{P} = \frac{M^2}{2K^2} \qquad \text{Eq. 1}$$

The second key parameter defined by the system is the average power for the added noise. For the Gaussian case identified above, the added noise is specified by its bandwidth B and one half the in-band spectral density, i.e. $N_a$, as shown in FIG. 3. The bandwidth B is the bandwidth of the GPS code. The spectral density $N_a/2$ is set by determining the standard deviation $\sigma_a$ of the signal, since $\sigma_a^2 = N_a B$. The preferred choice is $\sigma_a = LSB$, where LSB is the voltage level associated with the least significant bit of the A/D converter 205. An exact value for $\sigma_a$ is not critical to the system, however if the value of $\sigma_a$ is too small, a loss of GPS signal will result. For example, losses at the preferred level of $\sigma_a$ is 0.35 dB, losses at half this level is 1.4 dB, and the losses degrade rapidly from there to a level where the GPS signal is no longer recoverable. A larger setting for $\sigma_a$ unnecessarily burdens subsequent processing, which must eventually accommodate the added noise.

The average power setting for the added noise is directly related to the number of bits Nbits specified for the A/D converter 205. Indeed, for the preferred setting $\sigma_a = LSB$, the choice of an Nbit A/D converter 205 with dynamic range M will require $$\sigma_a = LSB = \frac{2M}{2^{Nbits}}.$$

It is assumed that the quantization levels are uniformly spaced. This linkage plays an important role in the system, as described in further detail below.

To determine the number of bits Nbits in the A/D converter 205, the downstream processing impact of the corresponding added noise according to the linkage described above needs to be factored in. The processing impact is measured (even for a narrow-band jammer) in terms of an equivalent total wide-band noise in the signal-detection processing module 105. By determining optimum set point and average power of the added noise, the downstream impact can be represented as a simple factor by which this equivalent noise level is increased by the added noise of the system.

For a narrow-band Gaussian jammer, a downstream processing factor (DPF) is given by Equation 2

$$DPF = 1 + \left(\left(\frac{K^2}{2^{Nbits-2}}\right) \times \frac{J}{\tilde{J}}\right) \qquad \text{Eq. 2}$$

where $J/\tilde{J}$ is the ratio of jamming signal powers before and after the receiver jam-suppression stage. A narrow-band jammer is defined as a jammer whose bandwidth Bj<<B, but is wider than the bandwidth (i.e. reciprocal response time) of the AGC 203 control loop.

For a wide-band Gaussian jammer (i.e. bandwidth Bj≧B) the downstream processing factor is given by Equation 3

$$DPF = 1 + \left(2 \times \left(\frac{K^2}{2^{Nbits-2}}\right) \times \frac{J}{\tilde{J}}\right). \qquad \text{Eq. 3}$$

For the case of an extremely narrow band jammer (i.e. bandwidth Bj<<than the AGC 203 bandwidth≅a pure tone jammer) the downstream processing effect does not yield to a simple formulation but requires a numerical calculation.

In each of the above jammer cases, the number of bits Nbits in the A/D converter 205 is chosen to keep the DPF within reasonable bounds based on the other system parameters contained in Equations 2 and 3.

These above expressions are saturation levels appropriate to large jamming signals. For smaller jammer power, the factors go through a transition region and reduce rapidly to unity (i.e. no impact) as the post-suppression jamming signal becomes smaller than receiver thermal noise. Also, the added noise effect (i.e. the difference of these factors from unity) is amplified by the power of the jam-suppression processing module 206. The jam-suppression stage reduces power in the jammer signal, but the added noise remains. For large jamming expressions, the jamming signal power itself does not appear. What appears is the ratio of jammer powers before and after jam-suppression processing. In the case of a linear jam-suppression process, this power ratio will be constant for all jammer levels, as long as the suppressed value is still above the effective noise floor, and the effectiveness of the A/D converter 205 is uniform at all higher jamming levels. This is in contrast to the conventional approach described above, in which a narrow-band jamming level that rises above the system design level quickly causes the A/D converter 205 to cancel the GPS signal entirely and destroys the system operation.

The following non-limiting examples illustrate the advantages of the present invention over the convention GPS receiver.

EXAMPLE I

As a first example, for the case where $J/\tilde{J}=50$ dB and K=2.628, the loss factor computed for Nbits=12 is 0.662 dB for narrow band, and 1.237 dB for wide band jammers. The numerically evaluated loss for the pure tone jammer is ~3 dB. Identical wide and narrow band losses are achieved at Nbits=10 for $J/\tilde{J}=38$ dB, and at Nbits=8 for $J/\tilde{J}=26$ dB. For these cases, the loss factor attains its maximum value at a J/S power ratio ~90 dB, 78 dB, and 66 dB, respectively. Beyond these limits, the loss factors are unaffected by further increases in jamming level. In particular, these loss values apply at the specified bit depths at the current military requirement of J/S power ratio=120 dB and beyond.

EXAMPLE II

As another example, a baseline case expressing the capabilities of the system is the case where K=2.628, Nbits=12, $J/\tilde{J}=50$ dB, with $\sigma_a$=LSB. The narrow band jammer loss=0.662 dB for all jamming levels having a J/S power ratio of 90 dB and beyond (i.e. including 120 db), and is less for all jamming levels below 90 dB. The key point is that application of the system according to the present invention reduces the word length of the A/D converter 205 by 4-5 bits, which translates into a factor of 16 to 32 in resolution/linearity requirements, while only realizing a loss factor of ~1.2 to 2 dB in the worst case. Application of the system thus represents a huge technology simplification for A/D converters in a GPS system.

EXAMPLE III

In the case of a pure tone jammer, the jammer signal is represented by Equation B-1

$$J(t)=A_J \cos(2\pi f_J t + 2_J) \quad (B-1).$$

The jammer power is represented by Equation B-2

$$J=A_J^2/2 \quad (B-2).$$

The full received input signal is the GPS signal plus noise n(t) plus the jammer signal J(t), and the objective is to keep the jammer from seizing control of the A/D converter. The input signal is represented by Equation B-3

$$r(t)=Ap(t)\cos(2\pi f_c t+\theta_s)+n(t)+J(t) \quad (B-3)$$

where n(t) is band limited noise of spectral density $N_o/2$ in the system passband.

A down-converter and low-pass filter of bandwidth B processes the input signal. The A/D converter operation occurs after down conversion and low-pass filtering. Multiplication by the local code and summation produces the I and Q summation values passed to subsequent processing. Determining the number of bits Nbits for the A/D converter proceeds as follows.

First quantizing to the noise level is required. Specifically, there will be quantities $\tilde{n}^{I,Q}(t)$ of noise that appear just after the LPF, according to Equation B-4.

$$\tilde{n}^{I,Q}(t)=\tilde{r}^{I,Q}(T)-E(\tilde{r}^{I,Q}(T)) \quad (B-4)$$

Where E( ) represents the expected (average) value over the noise process. These quantities have he autocorrelation functions as defined by Equation B-5.

$$R_I(t-t')=R_Q(t-t')=\sigma^2 \text{sinc}(\pi B(t-t')), R_{I,Q}(t-t')=0 \quad (B-5)$$

where $$\sigma^2=N_0 B \quad (B-6).$$

If quantizing is such that the level change associated with the least significant bit is $\leq$ one $\sigma$, then the mean and variance of the quantized values $\tilde{r}_k^{I,Q}$ are the same as they would be if the quantization had been to infinite precision. The requirements for this result are expressed by Equation B-7

$$\text{LSB}=\sigma \quad (B-7).$$

Any given sample $\tilde{r}_k^{I,Q}$ can take only one of the values allowed by the quantization, and that the statement above is a statement on the statistics of the samples. The statistical statement however is sufficient, because only the summations I and Q are passed to subsequent processing. The I and Q summations each involve many thousands of individual samples $\tilde{r}_k^{I,Q}$. Then the mean and variance if I and Q will accurately reflect the mean and variance of the samples. The consequence is that means of I and Q are unaffected by quantization to the level indicated by Equation B-7, while the variance is enhanced by only 0.37~dB. For purposes of all subsequent processing, this quantization level is all that is required, and in fact, a deeper level achieves essentially no further benefits.

Starting from this result, the standard argument for 16-bit quantization in the conventional system is as follows. In the case of the pure tone jammer of Equation B-1, the full range to be covered by the sampling is $2A_J$, with the LSB given by Equation B-7, the total number of levels is $2A_J/\sigma$, or $$2^{Nbits} = \frac{2A_J}{\sigma} = \frac{2A_J}{\sqrt{N_0 B}}. \quad (B-8)$$

To operate with J/S=120 dB, Equations B-8 and B-2 are combined to arrive at Equation B-9

$$2^{2Nbits} = \frac{4A_J^2}{N_0 B} = \frac{8J}{N_0 B} = \frac{8S}{N_0 B} \times (J/S). \quad (B-9)$$

For precision P(Y) code, S=−133 dBm, $N_0$=−171 dBm/Hz, B=20.46 MHz, so that Equation B-9 yields $S/N_0 B$=−35.11 dB and therefore $$(2^{2Nbits})_{dB}=9.03-35.11+120=93.92 \text{ dB} \quad (B-10)$$

which yields $$(2^{Nbits})_{dB}=47 \text{ dB or Nbits}=16 \quad (B-11)$$

Equation B-11 represents the usual statement that 120 dB J/S power ratio requires 16-bit quantization to reach the noise level.

In the present invention, additional wideband noise is injected at the input. The thermal value $N_0$ in Equation B-8 is replaced with an artificially enhanced noise value $N_0^a$ whose magnitude is such that the calculation from Equations B-8 to B-11 yields 12 bits instead of 16. The required analysis is to show that the addition of such noise has little impact on overall system performance.

The argument is based on carefully separating the noise effects. A central result is that the pure tone jamming signal appears in the system in two different forms. Ahead of multiplication by the local code (in particular, at the point of operation of the A/D converter 205), the signal is deterministic and highly correlated and makes no contribution to the signal variance. After multiplication by the pseudo-random P(Y) code, the jamming signal is converted into a noise like signal, and makes a significant contribution to the variance of the system output. The addition of a noise-like signal ahead of the A/D converter allows it to "split the difference," adding noise that has a significant impact on the variance that determines the A/D converter bit requirement but that has only minimal impact on the variance of the system output.

In particular, the variance of the system output I and Q (without regard to quantization) is given by Equation B-12

$$E((I-\bar{I})^2) = E((Q-\bar{Q})^2) = \frac{N_0^{tot} T}{4} \quad \text{(B-12)}$$

where $$N_0^{tot} = N_J^{eff} + N_0^{thermal} \quad \text{(B-13)}$$

and $N_J^{eff}$ is an effective spectral density appropriate to any Gaussian jammer. If the pure tone jammer is replaced by a nearly equivalent jammer of extremely narrow bandwidth, the appropriate $N_J^{eff}$ is given by Equation B-15

$$N_J^{eff} = JT_c \quad \text{(B-15)}$$

where J is the jammer power and $T_c$ is the P(Y) code chip time=2/B. If broadband noise $N_0^a$ is artificially added at the input, Equation B-13 will be replaced by Equation B-16

$$N_0^{tot} = N_J^{eff} + N_0^a + N_0^{thermal} \quad \text{(B-16)}.$$

For the high jamming case, $N_J^{eff}$ dominates in Equation B-16 and hence dominates the downstream performance of the receiver. Then the performance effect of artificially added noise $N_0^a$ is not determined by its relation to $N_0^{thermal}$ (in the high jamming case $N_0^a \gg N_0^{thermal}$ to arrive at 12 bits in Equation B-11), but by its relation to $N_J^{eff}$. The argument that follows shows that $N_0^a$ can be chosen large enough relative to $N_0^{thermal}$ to support 12 bit quantization (at the point where the jammer signal is still deterministic), but still small enough relative to $N_J^{eff}$ to have minimal performance impact on the downstream processing of the I and Q signals.

The case of little to no jamming is handled by the particular implementation chosen, as discussed below. The process requires only that determinations are made relative to the system front-end processing. Front-end processing is an intermediate step between A/D conversion and the correlation processing to suppress the power of the input jammer by some form of a frequency excision or power suppression process. There are three stages to be considered.

The relevant pieces of the input signal are the jammer signal and the thermal noise. Once noise is artificially added, the jammer signal is unaltered but the relevant noise spectral density goes to $N_0^a + N_0^{thermal}$. This combined spectral density is operative at the A/D conversion, and determines the required LSB level according to Equation B-17

$$LSB = \sigma_a = \sqrt{N_0^a B} \quad \text{(B-17)}.$$

In determining Equation B-17, the case where $N_0^a$ dominates the noise spectrum ahead of the A/D converter 205 has been presumed. In the implementation described below, this case will correspond to the case of large jamming. Once the A/D conversion is complete, jam suppression reduces the jammer signal power from J to $\tilde{J}$, but still leaves a highly correlated signal. Multiplication by local code converts the remaining jammer signal to a noise component, so that the relevant noise quantity for the output I and Q is given by Equation B-18

$$N_0^{tot} = N_{\tilde{J}}^{eff} + N_0^a + N_0^{thermal} \quad \text{(B-18)}$$

where the effective spectral density from the jammer is now determined only by the suppressed jammer power $\tilde{J}$ according to Equation B-19

$$N_0^{eff} = \tilde{J} T_c \quad \text{(B-19)}.$$

As discussed above, $N_0^a$ is chosen so that $N_{\tilde{J}}^{eff}$ still dominates in Equation B-18, hence, $$N_0^a = \frac{N_{\tilde{J}}^{eff}}{4} = \frac{\tilde{J} T_c}{4}. \quad \text{(B-20)}$$

In the large jamming limit, $N_0^a$ according to Equation B-20 will dominate over $N_0^{thermal}$ and Equation B-17 will apply. The system consequence will be that $N_0^{tot}$ of Equation B-18 is increased by a factor of 1.25 over the value it would have been if the noise $N_0^a$ was not added. The SNR (signal-to-noise ratio) in I and Q is thus reduced by 1/1.25=–0.97 dB. That is, in the large jamming limit, the system consequence of injecting the noise given by Equation B-20 is a SNR reduction of just slightly under one dB.

The impact of Equation B-20 on the A/D converter 205 requirement will now be considered. Just ahead of the A/D converter 205, where the relevant noise spectrum is $N_0^a + N_0^{thermal}$, in the large jamming limit, and with the choice Equation B-20, $N_0^a$ will dominate, and the quantization LSB is set by Equation B-17. Then Nbits is determined according to Equation B-8 as shown in Equation B-21

$$2^{Nbits} = \frac{2A_J}{\sigma_a} = \frac{2A_J}{\sqrt{N_0^a B}}. \quad \text{(B21)}$$

By Equation B-20, Equation B-22 is determined $$2^{Nbits} = \frac{4A_J}{\left(\frac{\tilde{J} T_c}{4}\right) B} = 16 \times \left(\frac{J}{\tilde{J}}\right) \quad \text{(B-22)}$$

using $BT_c = 2$ and $J = A_J^2/2$. The ratio $$\left(\frac{J}{\tilde{J}}\right)$$

represents the effectiveness of the jam suppression stage. For $$\left(\frac{J}{\tilde{J}}\right) = 60 \text{ dB},$$

$$(2^{2Nbits})\text{dB} = 12.04 + \left(\frac{J}{j}\right)\text{dB} = 12.04 + 60 = 72 \text{ dB} \quad (B\text{-}23)$$

or $$(2^{Nbits})\text{dB} = 36 \text{ dB or } Nbits = 12. \quad (B\text{-}24)$$

The choice of Equation B-20 for artificially added broadband noise supports the highest level of jam suppression considered (i.e. 60 dB) with 12-bit quantization, with an overall system penalty of only 0.97 dB reduction in SNR.

In actual implementation, the value of the added noise is not chosen according to Equation B-20, which requires a measurement of the jamming signal, but by an indirect procedure that matches Equation B-20 when the jamming is large. In the proposed implementation, the A/D converter 205 is run at 12 bits, with an automatic gain control to ensure use of the full dynamic range, and noise is injected at all times according to $\Phi_a$=LSB. The noise level is sufficient to randomize the LSB ($12^{th}$ bit) at all times. For J/S power ratio levels below 98 dB, bits at the $12^{th}$ bit or lower order will be randomized by system thermal noise alone, and there will be no additional loss induced by this added noise. On the other hand, with the $12^{th}$ bit thus sufficiently random, Equation B-9 is satisfied by Nbits=12. For $N_0$=pure thermal noise=171 dBm/Hz, the maximum J/S power ratio for which (B-9) is satisfied is 98 dB. For jamming levels above 98 dB, the $12^{th}$ bit will not be random unless noise is artificially added. But since the implementation always adds noise sufficient to randomize the $12^{th}$ bit, this bit will remain random at all higher J/S levels. As long as the added noise is just enough to keep the $12^{th}$ bit random, the reverse of the above calculation shows that (B-20) is being satisfied and the effective system loss from the added noise will reach 0.97 dB. In this way, the loss will be controlled, and all system functions, including precorrelation jam suppression, will be fully enabled by the 12-bit quantization.

It is noteworthy that Equation B-22 differs from Equation B-9 in that the bit depth required by Equation B-22 is determined only by the jam suppression capability of the front end processing, while the bit depth in Equation B-9 depends on the maximum J/S power ratio levels expected. As this front end processing becomes better defined and the jam suppression capability is quantified, the bit depth of the A/D converter 205 requirement can be set accordingly. This implementation allows for the A/D converter bit depth to be set, even as the jamming environment evolves.

The conventional approach to setting the bit depth requirement leads to bit depths of 16-17 bits to accommodate 120 dB J/S power ratio. This bit depth requirement at 20-40 MHz rates required to capture the GPS P(Y) code represents a major technology challenge in the conventional GPS receiver technology in general, and is not yet achieved in A/D converter technology at sizes and powers appropriate for military GPS receivers, i.e. 120 dB J/S power ratios. Moreover the bit depth requirement increases logarithmically as the jamming capability and/or power increases.

In the present invention, the bit depth requirement at 120 dB J/S power ratio is reduced immediately to 12 bits, and the direct sensitivity to further increase in jamming power is removed. As a general concept, noise can be inserted to establish any bit depth desired, so long as that bit depth can sustain operation of the precorrelation jam-suppression process. With the prescribed operation of the AGC the true jamming level, even after jam suppression, will always be higher than this added "jamming" and the impact of the added noise on the processing to extract the signal will be minimal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for reducing a bit depth requirement for an A/D converter in a GPS (Global Positioning System) receiver having an antenna for receiving an analog input signal, said input signal having a GPS signal component and a jamming signal component, and a jam suppression processor for suppressing the jamming signal component, comprising:
 a filter/down-conversion module for filtering the received signal about a bandwidth B of a GPS code and centering about a center frequency $f_0$ the frequency of the filtered signal;
 an automatic gain controller (AGC) for setting a set point of the down-converted signal;
 a noise generator for generating noise;
 an adder for adding the generated noise to the gain controlled signal; and
 an analog to digital (A/D) converter for converting the added noise signal to a digital signal,
 wherein the noise added to the gain controlled signal reduces the bit depth requirement of the A/D converter.

2. The system of claim 1, wherein the filtering/down-conversion module adjusts the bandwidth B and the center frequency $f_0$ of the input signal to match a spectral density of the noise.

3. The system of claim 2, wherein the power level of the noise is based upon the bandwidth B and the center frequency $f_0$.

4. The system of claim 1, wherein the set point is determined by $$\overline{P} = \frac{M^2}{2K^2},$$

where $\overline{P}$ is the set point, M is the dynamic range of the A/D converter, and K is constant to prevent clipping of the input signal.

5. The system of claim 2, wherein the power level of the noise is determined according to $$N_a = \frac{\sigma_a^2}{B},$$

where $N_a$ is the power level of the noise and $\sigma_a$ is the standard deviation of the signal.

6. The system of claim 5, wherein $$\sigma_a = \frac{2M}{2^{Nbits}},$$

where Nbits is the bit depth of the A/D converter and M is the dynamic range of the A/D converter.

7. The system of claim 5, wherein $\sigma_a$ is set equal to the power level of a least significant bit (LSB) of the A/D converter.

8. The system of claim 1, wherein the bit depth is determined based on a downstream processing factor (DPF), said DPF being representative of the effect the added noise has on jam suppression processing.

9. The system of claim 8, wherein the DPF for a narrow-band Gaussian jammer is determined by $$DPF = 1 + \left(\left(\frac{K^2}{2^{Nbits-2}}\right) \times \frac{J}{\tilde{J}}\right)$$

where $J/\tilde{J}$ is the ratio of a jamming signal power before a receiver jam-suppression stage to a jamming signal power after the receiver jam-suppression stage, Nbits is the bit depth, and K is a constant to prevent clipping of the input signal.

10. The method of claim 8, wherein the DPF for a wide-band Gaussian jammer is determined by $$DPF = 1 + \left(2 \times \left(\frac{K^2}{2^{Nbits-2}}\right) \times \frac{J}{\tilde{J}}\right)$$

where $J/\tilde{J}$ is the ratio of a jamming signal power before a receiver jam-suppression stage to a jamming signal power after the receiver jam-suppression stage, Nbits is the bit depth, and K is a constant to prevent signal clipping.

11. The system of claim 8, wherein the DPF for a pure tone jammer is calculated by analysis of sampled data.

12. The system of claim 1, wherein the AGC controls the gain of the down-converted signal to one of maximize the dynamic range of the system by increasing the level of the down-converted signal and minimize clipping of down-converted signal by decreasing the level of the down-converted signal.

13. A method for reducing a bit-depth requirement for an A/D converter in a GPS (Global Positioning System) receiver having an antenna for receiving an analog input signal, said input signal having a GPS signal component and a jamming signal component, and a jam suppression processor for suppressing the jamming signal component, comprising the steps of:

adjusting the input signal to a set point;

determining a bit depth at which to operate an A/D converter for converting an analog signal into a digital signal;

calculating a power level of a least significant bit (LSB) of the digital signal;

determining the power level of a noise signal based on the power level of the LSB;

adding the noise signal to the adjusted input signal; and

A/D converting the noise added signal.

14. The method of claim 13, wherein the determining of the bit depth is based on a downstream processing factor (DPF), said DPF being representative of the effect the added noise has on jam suppression processing.

15. The method of claim 14, wherein the DPF for a narrow-band Gaussian jammer is determined by $$DPF = 1 + \left(\left(\frac{K^2}{2^{Nbits-2}}\right) \times \frac{J}{\tilde{J}}\right)$$

where $J/\tilde{J}$ is the ratio of a jamming signal power before a receiver jam-suppression stage to a jamming signal power after the receiver jam-suppression stage, Nbits is the bit depth, and K is a constant to prevent clipping of the input signal.

16. The method of claim 14, wherein the DPF for a wide-band Gaussian jammer is determined by $$DPF = 1 + \left(2 \times \left(\frac{K^2}{2^{Nbits-2}}\right) \times \frac{J}{\tilde{J}}\right)$$

where $J/\tilde{J}$ is the ratio of a jamming signal power before a receiver jam-suppression stage to a jamming signal power after the receiver jam-suppression stage, Nbits is the bit depth, and K is a constant to prevent signal clipping.

17. The method of claim 14, wherein the DPF for a pure tone jammer is calculated by analysis of sampled data.

18. The method of claim 15, wherein the set point is determined by $$\overline{P} = \frac{M^2}{2K^2}$$

where $\overline{P}$ is the set point, M is the dynamic range of the A/D converter and K is constant to prevent clipping of the input signal.

* * * * *